(12) United States Patent
Petillo et al.

(10) Patent No.: US 6,544,679 B1
(45) Date of Patent: Apr. 8, 2003

(54) ELECTROCHEMICAL CELL AND ASSEMBLY FOR SAME

(75) Inventors: Phillip J. Petillo, Ocean, NJ (US); Steven Amendola, Wayside, NJ (US); Stephen C. Petillo, Ocean, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 0 days.

(21) Appl. No.: 09/552,017

(22) Filed: Apr. 19, 2000

(51) Int. Cl.[7] .................................. H01M 8/04
(52) U.S. Cl. ................................ 429/34; 429/38
(58) Field of Search .................. 429/12, 13, 14, 429/17, 30, 38, 95, 96, 98, 151, 159, 34

(56) References Cited

U.S. PATENT DOCUMENTS

| | | |
|---|---|---|
| 857,607 A | 6/1907 | Decker |
| 2,876,179 A | 3/1959 | Bindwhistle |
| 3,033,766 A | 5/1962 | Schechter |
| 3,511,710 A | 5/1970 | Jung et al. .............. 136/86 |
| 3,562,019 A | 2/1971 | Spahrbier |
| 3,892,592 A | 7/1975 | Fukuda |
| 4,217,400 A | 8/1980 | Leffingwell ............ 429/7 |
| 4,227,987 A | 10/1980 | Kircher et al. ......... 204/228 |
| 4,390,763 A | 6/1983 | Hruda .................. 200/144 B |
| 4,397,925 A | 8/1983 | Magahed |
| 4,421,614 A | 12/1983 | Yamaguchi et al. ...... 204/98 |
| 4,492,741 A | 1/1985 | Struthers |
| 4,508,793 A | 4/1985 | Kumata et al. |
| 4,808,282 A | 2/1989 | Gregory |
| 5,093,213 A | 3/1992 | O'Callaghan ............. 429/27 |
| 5,298,037 A | 3/1994 | Murphy et al. |
| 5,312,533 A | 5/1994 | Mayr et al. ............. 204/282 |
| 5,372,692 A | 12/1994 | Sakamoto et al. ....... 204/268 |
| 5,415,949 A | 5/1995 | Stone et al. ............. 429/63 |
| 5,439,758 A | 8/1995 | Stone et al. ............. 429/63 |
| 5,498,488 A | 3/1996 | Stocchiero ............... 429/72 |
| 5,558,947 A | 9/1996 | Robison |
| 5,599,640 A | 2/1997 | Lee et al. |
| 5,650,241 A | 7/1997 | McGee .................... 429/67 |
| 5,804,329 A | 9/1998 | Amendola ............... 429/34 |
| 5,948,558 A | 9/1999 | Amendola |
| 6,030,718 A | 2/2000 | Fuglevand et al. ........ 429/26 |

FOREIGN PATENT DOCUMENTS

| | | |
|---|---|---|
| EP | 0313306 | 4/1989 |
| WO | WO 9620509 | 7/1996 |
| WO | WO 9957781 | 11/1999 |

Primary Examiner—Patrick Ryan
Assistant Examiner—M. Wills
(74) Attorney, Agent, or Firm—Gibbons, Del Deo Dolan, Griffinger & Vecchione

(57) ABSTRACT

The present invention provides for an electrochemical system, which includes electrochemical cells and a manifold system for receiving and interconnecting the cells in a manner which facilitates the removal and replacement of cells.

25 Claims, 8 Drawing Sheets

US 6,544,679 B1

ELECTROCHEMICAL CELL AND ASSEMBLY FOR SAME

FIELD OF THE INVENTION

The present invention relates generally to electrochemical systems, and more particularly relates to a removable electrochemical cell assembly and manifold system for receiving and interconnecting the same.

BACKGROUND OF THE INVENTION

Electrochemical cells, i.e., cells which employ a chemical reaction to develop an electrical potential, are an important aspect of many power delivery applications. In many of these applications, a suitable power source requires the use of multiple cells which are interconnected to provide a suitable output voltage and current capacity. Often, this is achieved by permanently electro-mechanically interconnecting a number of cells in a suitable configuration. Unfortunately, in such a case, when a single cell fails it is difficult to replace the defective cell. As a result, the entire battery must be replaced.

An improved electroconversion cell architecture and chemistries are described in U.S. Pat. No. 5,804,329, which is hereby incorporated by reference. In an embodiment of the electroconversion cell described therein, an anolyte solution is separated from a catholyte solution by a permiselective membrane. As the cell provides electricity to a load, a chemical conversion takes place in such solutions. To prolong the life of the battery, the solutions can be circulated through the cell, thereby replacing converted electrolyte solution with new electrolyte solution. In such a system, the electrolyte solutions can be perpetually replaced, and the anodes and cathodes in the cell assemblies generally do not degrade, resulting in a long life battery. Nevertheless, the cells can eventually fail for a variety of reasons, including physical damage, leakage, or terminal burnout. Thus, in a multi-cell battery, it would be desirable to be able to quickly replace a failed cell.

SUMMARY OF THE INVENTION

An object of the invention is to provide a battery architecture which facilitates the replacement of failed cells.

Accordingly, one aspect of the invention is to provide a removable electrochemical cell system assembly which may be engaged with an electrochemical cell manifold. The removable electrochemical cell assembly includes a cell housing having an interface surface, a first chamber, a second chamber, and at least one mechanical connector whereby the removable electrochemical cell may be engaged with the manifold. In addition, the cell assembly has a central membrane separating the first and second chambers, a pair of inlet and outlet conduits in fluid communication with each chamber and extending from the first chamber through the interface surface of the cell housing. The inlet and outlet conduits have connectors at the interface surface which can provide connection with corresponding conduits upon engagement with a manifold. Further, the cell assembly further includes an electrical conductor in each chamber extending from the chamber through the interface surface and electrically coupled to an electrical conductor to provide electrical connection with the manifold.

Preferably, the fluid, mechanical and electrical connectors of each cell are located on a single interface side of each cell and communicate with corresponding structures on the manifold. Thus, the invention provides that a cell assembly may be engaged in fluid and mechanical communication in a manner which facilitates the replacement of individual cells.

A further embodiment of the removable electrochemical cell assembly according to the invention is the incorporation of check valves with the inlet and outlet conduits of the cell assembly which may be operated to control the flow of a fluid in and out of the cell. The check valves may prevent the spillage of fluid from the cell assembly upon removal of the cell assembly from the manifold. In addition, check valves may be used to prevent the back-flow of fluid into a cell which may result when uneven pressure builds up among cells in the manifold.

A further aspect of the removable electrochemical cell assembly according to the invention is the incorporation of conductive filler material electrically coupled to the electrical conductor in either one or both of the chambers of the cell housing.

Another aspect of the removable electrochemical cell assembly according to the invention is the incorporation of one or more drain conduits in fluid communication with either one or both chambers of the cell housing. The drain conduit extends from a chamber through the interface surface of the cell housing. In addition, each drain conduit can include a check valve to prevent the spillage of fluid from the cell assembly upon removal of the cell assembly from the manifold. Further, each drain conduit can include a connector at the interface surface to provide connection with a corresponding conduit of the manifold. Further, each chamber with a drain conduit can have a purge valve extending from the chamber which may be operated in coordination with the check valve of the drain conduit.

A further aspect of the invention is to provide a removable cell assembly for operation with a manifold, where the removable cell assembly is adapted for use with hydrogen fuel cells. The removable hydrogen cell assembly incorporates a hydrogen fuel cell, which includes a hydrogen gas inlet conduit, an air inlet conduit, a by-product outlet conduit and electrical terminals. The hydrogen gas inlet conduit includes a fluid blocking filter to allow the inflow of hydrogen gas to the hydrogen fuel cell while preventing the entrance of fluid from the fluid conduit. The air inlet conduit includes a valve to allow air to enter the hydrogen fuel cell while preventing hydrogen gas from escaping. In addition, the removable hydrogen cell assembly includes a hydrogen cell fluid conduit which includes a fluid inlet aperture, a fluid outlet aperture, and a hydrogen collection chamber. The hydrogen collection chamber can be connected to the hydrogen gas inlet conduit, thereby allowing any collected hydrogen gas to pass to the hydrogen gas inlet conduit. The by-product outlet conduit of the hydrogen fuel cell includes a check valve and an outlet aperture connected to the hydrogen cell fluid conduit, thereby allowing any fluid by-product which may form in the hydrogen fuel cell to pass into the hydrogen cell fluid conduit while preventing fluid from the fluid conduit from entering the hydrogen fuel cell. The electrical terminals of the hydrogen cell allow the hydrogen fuel cell to be electrically coupled to the manifold upon engagement of the removable hydrogen cell assembly with the manifold.

A further aspect of the invention is to provide an electrochemical cell manifold for operation with a removable cell assembly. The manifold includes a contact surface and source and return fluid conduits supported by the manifold. Each conduit includes at least one fluid connector extending through the contact surface of the manifold to which can be engaged the fluid connectors of corresponding conduits of a removable cell assembly. In addition, the manifold includes electrical conduits supported by the manifold, each electrical conduit having at least one electrical receptor and at least one electrical terminal. The electrical receptors can allow connection with corresponding electrical conductors of a cell assembly upon engagement of the cell assembly with the manifold. The electrical terminals of the manifold can be any suitable electrical interface to allow any voltage potential created by a manifold and cell assembly combination to be applied to an external load. In addition, the manifold can include a mechanical connector to hold the removable cell to the manifold upon engagement of the cell assembly with the manifold.

An aspect of the electrochemical cell manifold according to the invention is the incorporation of one or more fluid drain conduits supported by the manifold. Each fluid drain conduit includes a connector extending through the contact surface which can provide connection with a corresponding drain conduit connector of a cell assembly.

A further aspect of the electrochemical cell manifold according to the invention is the incorporation of a fluid valve for each fluid connector of the manifold. The fluid valve can be operated to control the flow of fluid or to prevent the spillage of any fluid which can be in the manifold upon disengagement of a cell assembly from the manifold.

A further aspect of the electrochemical cell manifold according to the invention is the incorporation of a remote manifold with a remote contact surface connected to the fluid connectors and electrical receptors of the manifold by fluid and electrical extensions, thereby allowing the cell assembly to be engaged with the remote contact surface which can be remote from the contact surface of the manifold. In addition, the remote contact surface can include a remote mechanical connector which can hold the cell assembly to the remote contact surface.

Another aspect of the invention is to provide an electrochemical cell system wherein are combined a manifold and at least one removable electrochemical cell assembly, whose various forms have been described above. In addition to the incorporation of a manifold and one or more electrochemical cell assemblies, the electrochemical cell system includes at least one source fluid reservoir and at least one pump; each reservoir and pump connected to each source conduits supported by the manifold. The pump may control fluid flow from each fluid reservoir to a corresponding source fluid conduit. A second return reservoir can be used to provide fluid flow from a corresponding return fluid conduit to a return reservoir for used fluid. Another aspect of an electrochemical cell system described above is the incorporation of each return reservoir with each drain conduit of the manifold wherein each drain conduit empties into a used fluid reservoir.

Another aspect of the electrochemical cell system described above is the incorporation of one or more removable hydrogen cell assemblies. A removable hydrogen cell assembly can be engaged with the manifold of the system by connecting the fluid inlet aperture of the hydrogen cell assembly to a source fluid connector of the manifold, and by connecting the fluid outlet aperture of the hydrogen cell assembly to the manifold. Further, the electrical terminals of the removable hydrogen cell assembly can be electrically coupled to the electrical conduits of the manifold, and the mechanical connector of the hydrogen cell may be engaged with the mechanical connector of the manifold. Thus, one or more removable hydrogen fuel cell assemblies can be incorporated into a system for removal of any hydrogen gas built up by the processes of any electrochemical cell assemblies engaged with the system.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1:
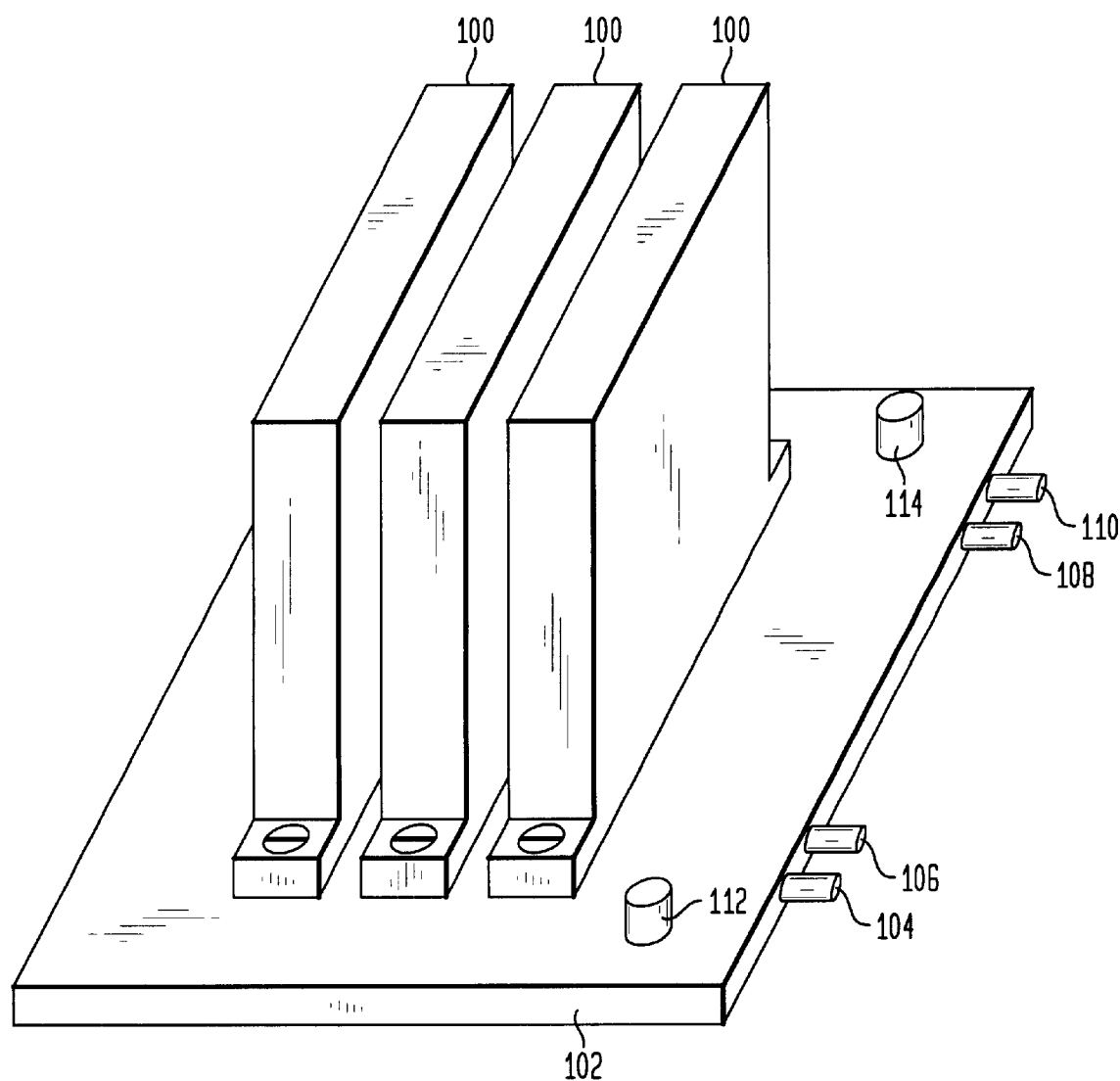
FIG. 1 is a perspective view of a battery formed with multiple, replaceable cells engaged with an interconnecting manifold.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

FIG. 1 is a perspective view illustrating an embodiment of the present invention which includes a plurality of replaceable cells 100 which are removably engaged on a supporting manifold 102. When the cells are engaged in the supporting manifold 102, the supporting manifold is in both fluid and electrical communication with the cells 100, thus establishing an electrochemical cell system. The system further includes multiple fluid interface nipples 104, 106, 108, 110 for circulating electrolyte fluids through the manifold 102 and cells 100. Electrical terminals, such as terminal posts 112, 114 are electrically connected to the cells 100 such that an electrical potential is presented across the terminal posts 112, 114. The terminal posts 112, 114, or other suitable electrical interface connection, provides a convenient way of connecting the battery assembly to a load.

When a cell 100 is operating to provide electricity to a load, an electrode in the cell that interacts with a "fuel" which gets oxidized is referred to as the anode. The fluid in this chamber is referred to as the anolyte. The other cell half has an electrode therein which is generally referred to as the cathode and the fluid provided to this chamber is referred to as the catholyte, which is a fluid, such as liquid catholyte, a paste, or air as would be the case in a half-air cell embodiment. The selection of the particular anolyte and catholyte fluids is not critical to the practice of the present invention, but can take the form of borohydride and sodium chlorate, respectively.

Figure 2:
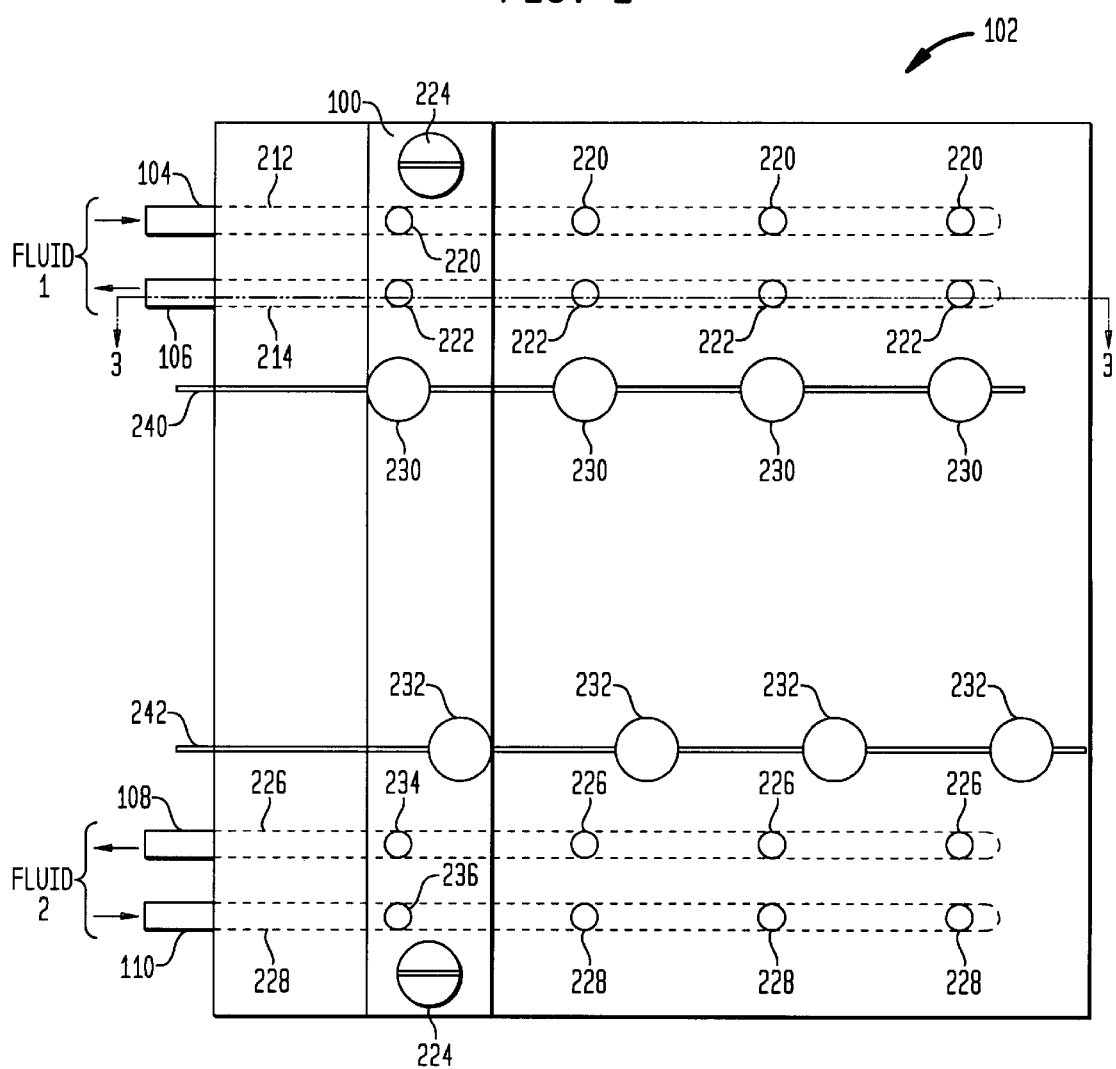
FIG. 2 is a top plan view of an interconnecting manifold.
Figure 3:
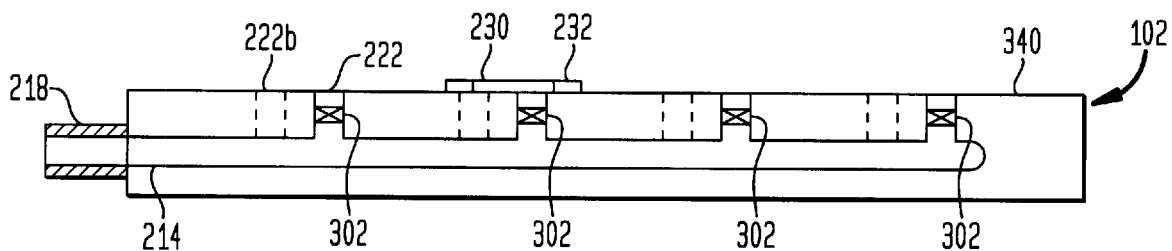
FIG. 3 is a cross sectional, elevation view of an exemplary manifold of FIG. 2.

FIGS. 2 and 3 illustrates an exemplary embodiment of the supporting manifold 102. The supporting manifold 102, which is preferably formed from an electrically insulating material, and generally has a thickness wherein at least two fluid conduits, a source fluid conduit 212, and a return fluid conduit 214 are formed, such as by boring holes therein. The manifold can be designed in a variety of shapes and configurations according to the particular application. The source fluid conduit 212 is in fluid communication with at least one source fluid connector 220 which extends through an interface surface of the manifold 102. The source fluid connector 220 provides fluid communication between the source fluid conduit 212 and a removable cell 100. Similarly, the return fluid conduit 214 includes at least one source fluid connector 222 which extends through an interface surface of the manifold 102 and provides fluid communication between the return fluid conduit 214 and a replaceable cell 100.

When a cell 100 is affixed to the manifold 102 by way of a mechanical connector 224, a fluid path is established from nipple 104, through conduit 212, aperture 220, cell 100, aperture 222, conduit 214 and returning to an external return reservoir (not shown) via the second nipple 106. In the event the selected battery chemistry requires an additional electrolytic fluid, a second pair of fluid conduits 226, 228 associated with fluid interface nipples 108, 110 and apertures 234, 236 can be established in a like manner. Mounting provisions 224 can take the form of conventional mounting provisions such as screws, a clamping device, a spring loaded arm with a ratchet which holds the cell in place upon engagement, or a hook with a catch mechanism. Alternatively, electrical, fluid and mechanical communication between the cell assembly and the manifold can be incorporated into a single structure, thereby providing for a cell architecture which may be incorporated onto a circuit-board.

One-way fluid valves, or check valves 302, may be interposed in the fluid path, either in the manifold 102 proximate to source and return fluid connectors 220, 222, as shown in FIG. 3, or in fluid inlet and outlet conduits of the cell assembly 100, or both. The source and return fluid connectors 220, 222 may open upon engagement of the cell assembly 100 with the manifold 102 to commence the flow of fluid to the cell and may close upon disengagement with the manifold 102 to prevent the loss of fluid from the cell assembly 100. Thus, check valves 302 allow on-the-fly cell replacement without the need to drain the manifold 102 and remaining cells. Alternatively, use of check valves allow the cells to be operated independently of the manifold, and brought into contact with the manifold for recharging of the cell. The check valves 302 can be spring loaded to close automatically when a cell is removed. The check valves 302 perform an additional function. Should a cell assembly 100 produce more Hydrogen gas by-product than another cell, the local increase in pressure caused by the gas could interfere with the operation of a proximate cell producing less Hydrogen gas. The incorporation of check valves 302 can prevent the back-flow of fluid in such a situation. The fluid check valves 302 can be manipulated manually, by operation of switch, or may be manipulated automatically by a sensor which triggers the operation of the check valve upon sensing the physical engagement or disengagement of the cell. In addition, check valves 302 may be manipulated remotely by computer according to predetermined conditions.

The supporting manifold 102 also includes anode connectors 230 and cathode connectors 232, which are exposed on the interface surface 340 of the manifold 102, e.g., the surface which interfaces with the removable cells 100. The electrical receptors 230, 232 can take the form of any electrical connection which are known in the art for providing a removably engageable electrical interface between the cells 100 and the manifold 102. For example, spring contacts, plug receptacles, spade receptacles and the like can be employed, so long as a suitable mating connection is provided on cell 100. The contacts can also be bipolar electrodes. In an alternate embodiment, a printed circuit board having conductive contact areas can be used to form, and interconnect, the electrical connectors, anode connector 230, and cathode connector 232. Advantageously, electrical switches may be employed in either the cell or at the site of electrical engagement with the manifold and operated in like manner of the check values described above, to control the application of electrical potential from a cell to the electrical conduits of the manifold. Such switches may prevent damage to cells or harm to an operator while cells are being replaced.

In the case of a battery having a plurality of cells, the electrodes 230, 232 may be interconnected by electrical conduits 240, 242 in either a parallel configuration (e.g., all anode connectors 230 interconnected and all cathode connectors 232 interconnected), or a series configuration (e.g., the anodes or cathodes sequentially cross connected). Any combination of these configurations is permitted by employing electrical switches at each electrical connection, depending on the desired battery voltage and current output. Where a series configuration is used, a switch across the anode and cathode may be used as a shunt when a cell is being replaced, thereby allowing continued operation.of the system. When a printed circuit board is used, the electrical conduits 240, 242 can be formed directly thereon. Alternatively, the electrical conduits 240, 242 can take the form of point-to-point wired connections, conductive strips affixed to the manifold 102, and the like.

Figure 4:
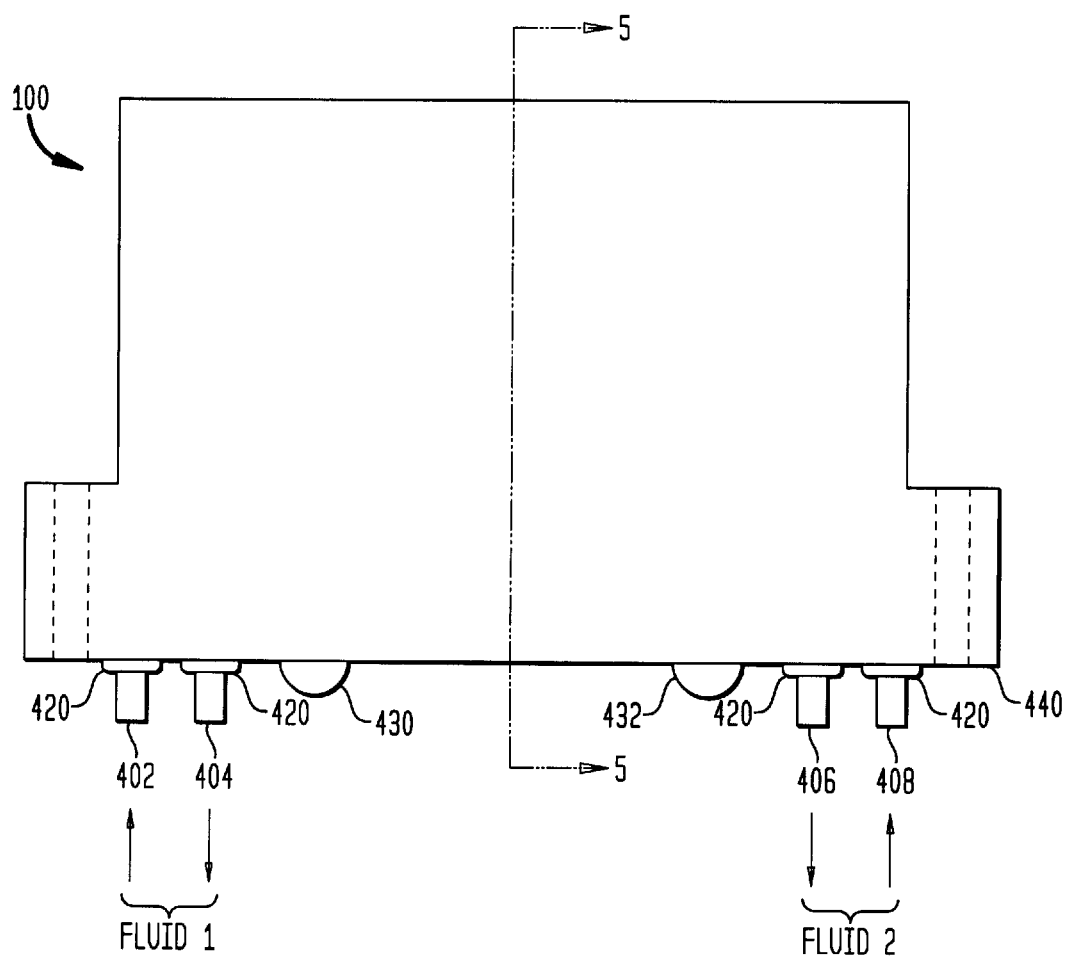
FIG. 4 is a front elevation view of a cell, suitable for interconnection with the manifold of FIG. 2.

Referring to FIG. 4, a cell 100 generally includes at an interface surface 440, a first inlet connector 402, and a first outlet connector 404 which when engaged with the manifold 102, provide fluid communication with the source and return connectors 220, 222 of the manifold. Similarly, a second inlet connector 406, and a second outlet connector 408 provide fluid communication with the source and return connectors 234, 236, when a second electrolytic fluid is to be circulated through the cell 100. To provide a substantially leak proof fluid engagement between the fluid connectors 402, 406 and the inlet and outlet apertures 234, 236, the fluid connectors 402, 406 should be sized and shaped for sealing engagement with inlet and outlet connectors. Further, sealing members, such as O-rings 420 can be provided. The O-rings can be designed so that when compressed, they fill the space around the inlet and outlet connectors, thereby providing a liquid tight seal.

The cell 100 further includes a first electrical terminal (anode terminal) 430 and a second electrical terminal (cathode terminal) 432. Terminals 430, 432 are placed in electrical contact with the electrical conduits 230, 232 of the manifold 102, respectively, when the cell 100 is engaged with the manifold 102. Mechanical engagement of the cell to the manifold can operate in coordination with the check valves and electrical switches to provide simultaneous electrical, fluid and mechanical connection between the cell assembly and the manifold.

Figure 5:
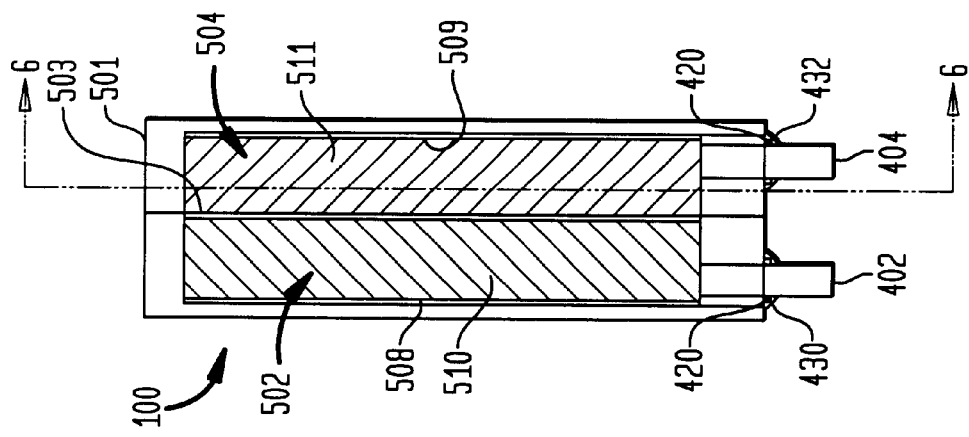
FIG. 5 is a cross sectional view, along section line 5—5, of the cell embodiment illustrated in FIG. 4.

FIG. 5 is a cross sectional view of cell 100 which further illustrates the internal construction of the cell 100. The cell 100 is generally formed by a container 501 with two half cells, or chambers 502, 504, which are separated by a central membrane or plenum 503 dividing the cell into a first (anode) chamber 502 and a second (cathode) chamber 504. The container 501 can be a variety of suitable materials, such as plastic, ceramic, graphic or a composite. Each cell half chamber includes a primary wall having a perimeter and perpendicularly extending wall sections which define a fluid containing well. The plenum 503 provides fluid isolation between the anode chamber 502 and cathode chamber 504. The plenum 503 is a permi-selective membrane which allows ion flow between the anode chamber 502 and the cathode chamber 503. As known in the art, and further described in U.S. Pat. No. 5,804,329, the plenum 503 can be an anionic membrane, a cationic membrane or a bipolar membrane, depending on the selected battery chemistry. The plenium 503 can be formed from a teflon or plastic film, such as Nathion, or a carbon coated membrane to provide for ion transfer. Furthermore, each cell can be provided with more than two chambers, each separated by at least one membrane. In an alternative embodiment, each cell with multiple chambers can have electrodes of various surface areas, thereby allowing the cell to produce charge at varying levels of power.

Figure 10:
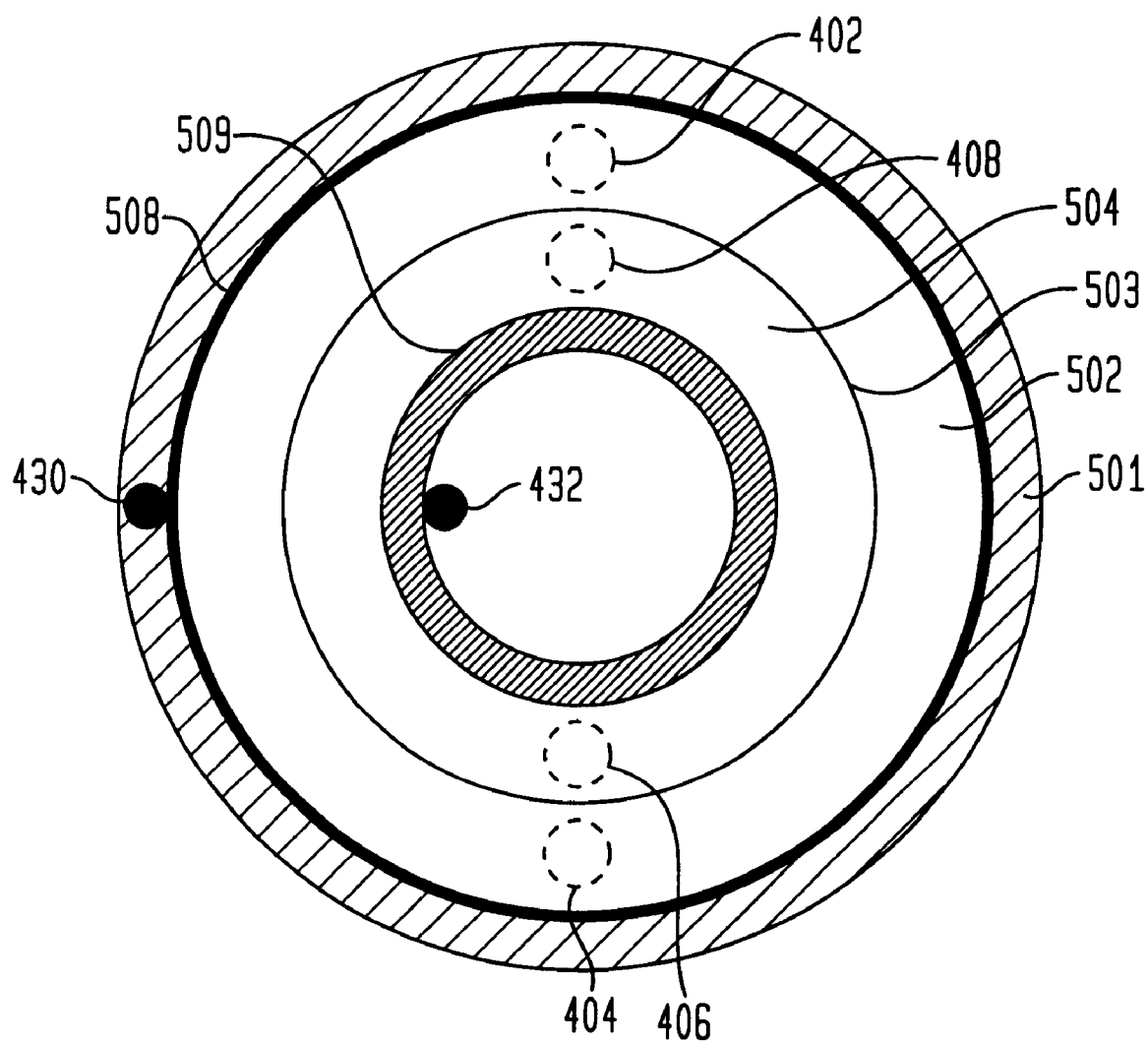
FIG. 10 is a cross sectional, top view of a cylindrical embodiment of the cell in FIG. 4.

FIG. 10 shows a cross-sectional, top view of a cylindrical embodiment of the cell in FIG. 4. The cell assembly can be designed in a number of different shapes and/or configurations to accommodate the particular space requirements called for by the cell's intended use.

Within the anode chamber 502 is a first electrical conductor or anode 508 which is electrically connected to the anode terminal 430. When using a replaceable fluid as the fuel for the cell 100, it is preferred that the anode 508 only function as a non-consumed conduit for the developed electrical potential and not take part in the electrochemical reaction. Preferably, the anode 508 and the anode terminal 430 are formed from a non-corrosive alloy, such as Monel®. The anode chamber 502 can be substantially filled with a conductive filler material 510 which enhances conductive surface area of the anode within the chamber without substantially inhibiting the flow of a first electrolytic fluid, which in the anode chamber takes the form of an anolyte. The filler material 510 can be conductive screening, metallic foams, woven metal products and the like which allow fluid to pass through while providing an increased surface area for conducting charge.

Similarly, within the cathode chamber 504 is a second conductor 509 which is electrically connected to the cathode terminal 432. Again, it is preferred that the second conductor 509 and cathode terminal 432 are formed from a non-corrosive alloy, such as Monel®. The cathode chamber 504 can be substantially filled with a second conductive filler material 511 which enhances conductive surface area without substantially inhibiting the flow of a second electrolytic fluid.

Figure 6:
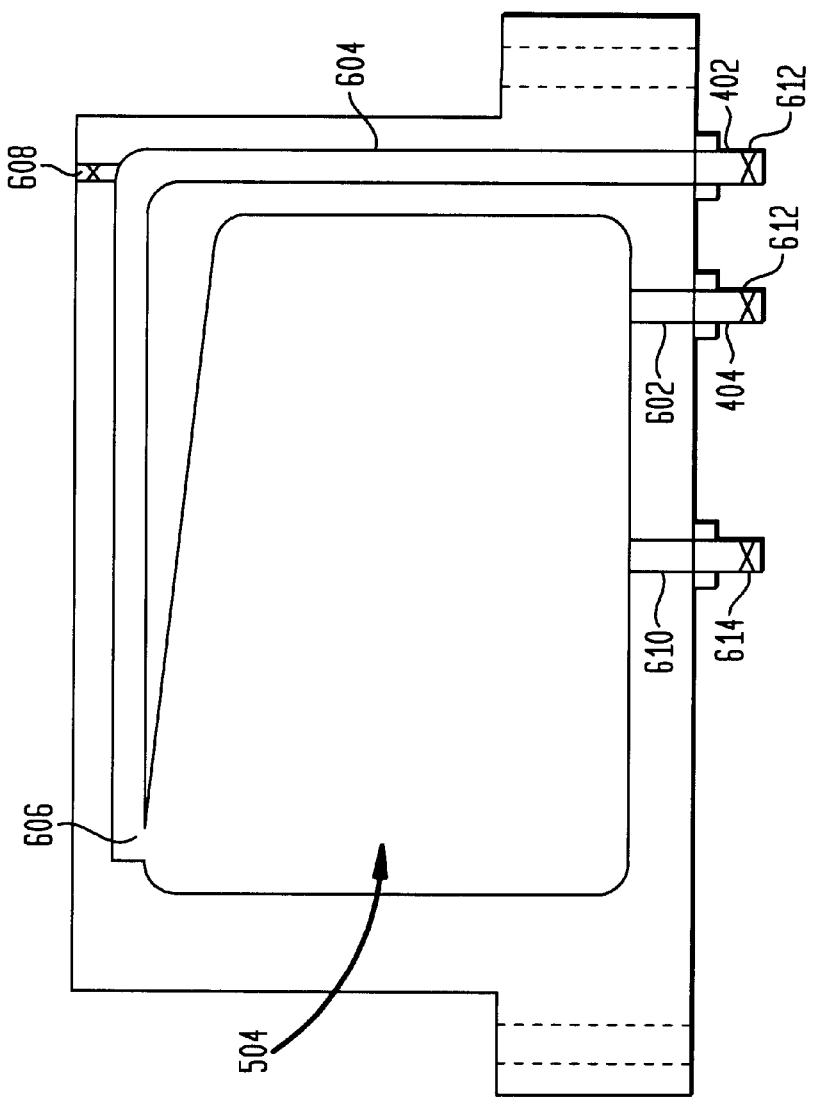
FIG. 6 is a cross sectional view, along section line 6—6, of the cell embodiment illustrated in FIG. 5.

FIG. 6 is a cross section of cell 100 further illustrating the internal construction of the cathode chamber 504 and the fluid conduits therein. Inlet connector 404 is in fluid communication with an inlet conduit 602 which can be bored through a portion of the perpendicularly extending sidewall to communicate with a bottom portion of the chamber 504. Outlet connector 402 is in fluid communication with an outlet conduit 604, which extends along the perimeter of the cell 100 and provides fluid communication with an upper portion of the cathode chamber 504 via fluid port 606. When the cell is engaged with the manifold 102, an electrolytic solution is applied to inlet connector 404, where the solution fills cathode chamber 504. When the cathode chamber 504 is full, the electrolyte solution returns through fluid port 606, outlet conduit 604 and outlet connector 402, where it is provided to the manifold 102, ultimately returning to a used electrolyte reservoir. Advantageously, where a replacement cell can be initially airfilled, a cell purge valve 608 can be incorporated to allow air from a newly installed cell to escape. Alternatively, when a cell is primed with electrolyte fluid before installation, or is stored with a non-reactive fluid, such as water, such a purge valve 608 may not be necessary.

The cell purge valve 608 may also be operated to facilitate the drainage of fluid from the cell assembly when the cell assembly is to be removed by allowing air to enter the cell assembly, thereby replacing the draining fluid. The cell purge valve 608 can be operated in coordination with the check valves 612 to provide for an open fluid outlet conduit and a closed fluid inlet conduit, thereby permitting the fluid to return to the system, while preventing air, let in through air purge valve 608, from entering the manifold.

In an alternative embodiment of the invention, a separate fluid drain conduit 610 can be incorporated for returning fluid to the system from a cell that is to be removed. In such an embodiment, the fluid drain conduit 610 can allow the fluid within a cell to be drained into a drain conduit of the manifold as air is let in by the cell purge valve 608. The drain conduit 610 can be operated with a check valve 614. Use of drain check valve 614 may be coordinated with check valves 612 and 608, such that when the cell is to be drained, check valves 612 are closed to prevent the draining of the cell from disrupting the pressure of the system.

Figure 7:
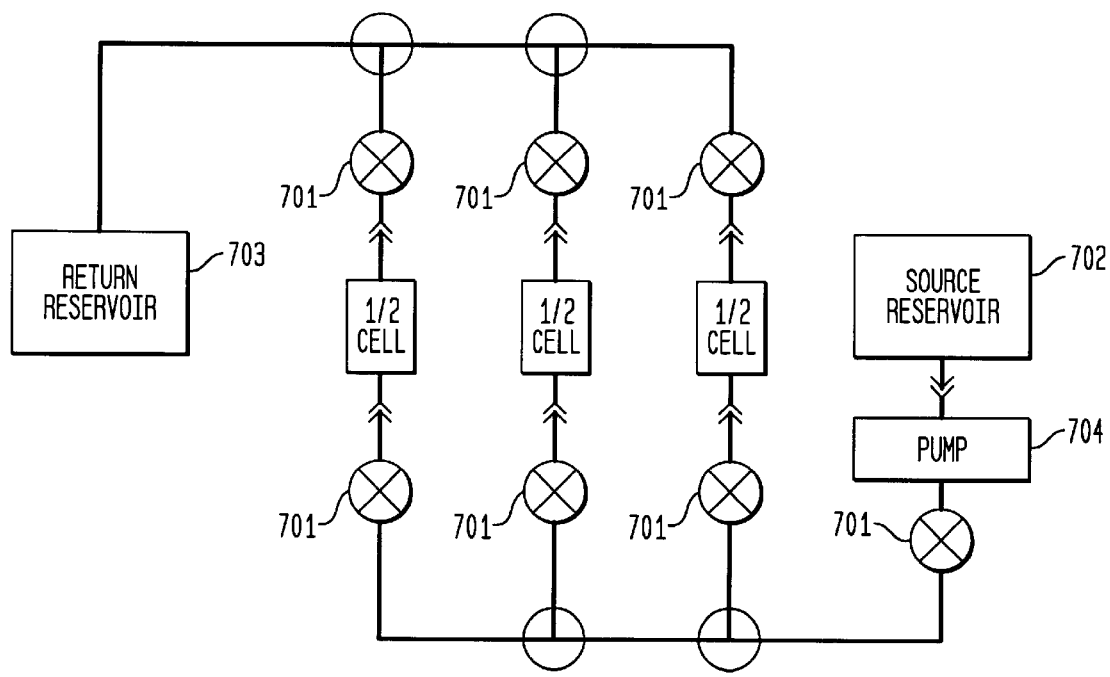
FIG. 7 is a schematic diagram of a fluid system suitable for use with the present cell and manifold combination.

FIG. 7 is a schematic diagram which illustrates an exemplary fluid transport system for an electrolyte for a series of cell halves of the present embodiment. A supply of electrolyte is stored in a source fluid reservoir 702 and is provided to the half cells by a supply pump 704. Alternatively, a pump would not be necessary where a configuration can allow fluid to be gravity fed through parts of the cell assembly. In series with each half cell of the battery, it is preferable that fluid check valves be installed to control the distribution of fluid and to facilitate the removal of the individual cells. A common return conduit is provided for the consumed electrolyte to be transported to a return fluid reservoir 703 as needed. The consumed electrolyte can be used for further industrial processes or can be restored by reversing the electro-chemical reaction to "recharge" the electrolyte. In an alternative embodiment, multiple manifolds can be interconnected to a common fluid and/or electrical system.

Figure 8:
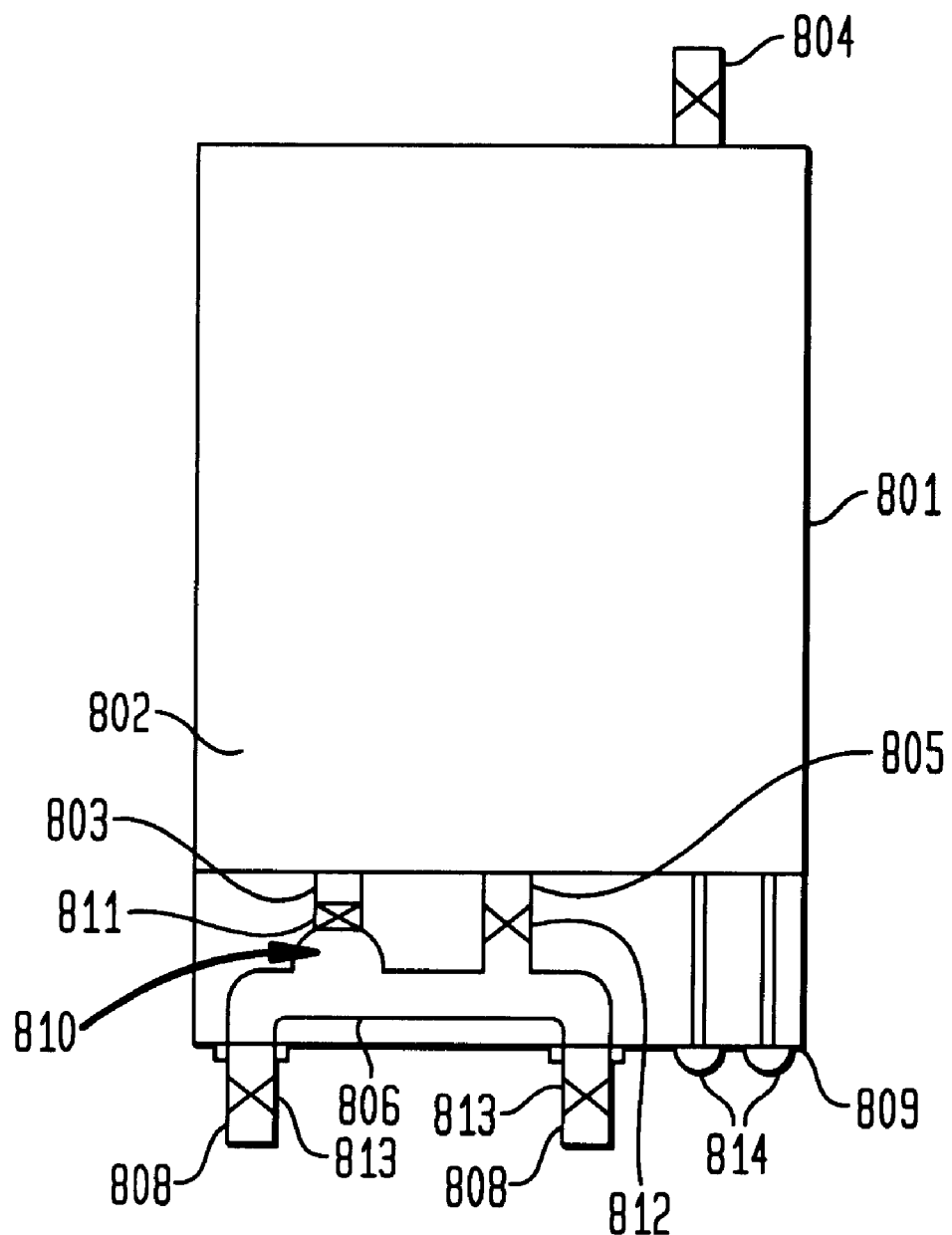
FIG. 8 is a cross sectional view of a removable hydrogen cell assembly for use with a manifold.

A Hydrogen fuel cell assembly, shown in FIG. 8, can be incorporated into the system to remove the Hydrogen gas by-product from the fluid and provide an additional source of electrical energy. The hydrogen cell assembly 801 includes a hydrogen fuel cell 802 which generally requires a hydrogen gas inlet conduit 803, an air inlet conduit 804, and a by-product outlet conduit 805. Hydrogen fuel cells are commercially available from Ballard Power Systems and DeNora, S.p.A. In addition, the hydrogen cell assembly 801 includes a fluid conduit 806 having an inlet aperture 807 and an outlet aperture 808 extending through an interface surface 809, and a hydrogen collection chamber 810. The hydrogen collection chamber 810 allows built-up hydrogen in the electrolyte passing through the fluid conduit 806 to collect and pass on to the hydrogen gas inlet conduit 803. The hydrogen gas inlet conduit 803 has a fluid blocking filter 811, such as a hydrophobic filter, so as to permit hydrogen gas into the inlet conduit while excluding the fluid electrolyte. The by-product outlet conduit 805 of the hydrogen cell 802 allows water, which can result from the reaction in the hydrogen fuel cell, or other liquid to pass from the hydrogen fuel cell on to the fluid conduit 806. The by-product outlet 805 has a one-way check valve 812 to prevent fluid from the fluid conduit 806 from flowing back into the hydrogen cell 802. Water by-product of the Hydrogen fuel reaction may alternatively be either wicked away from the hydrogen fuel cell, or siphoned off and returned to the manifold. The by-product outlet 805 may have a oneway check valve 812 or use a hydrophilic filter. Check valves 813 may be employed in the fluid conduit 806 to control the flow of fluid through the assembly. The hydrogen cell assembly also may include electrical terminals 814 for applying electrical energy to the manifold 102. One or more Hydrogen fuel cells may be engaged with the manifold as may be required to remove various levels of hydrogen gas from one or more fluids of the system.

Figure 9:
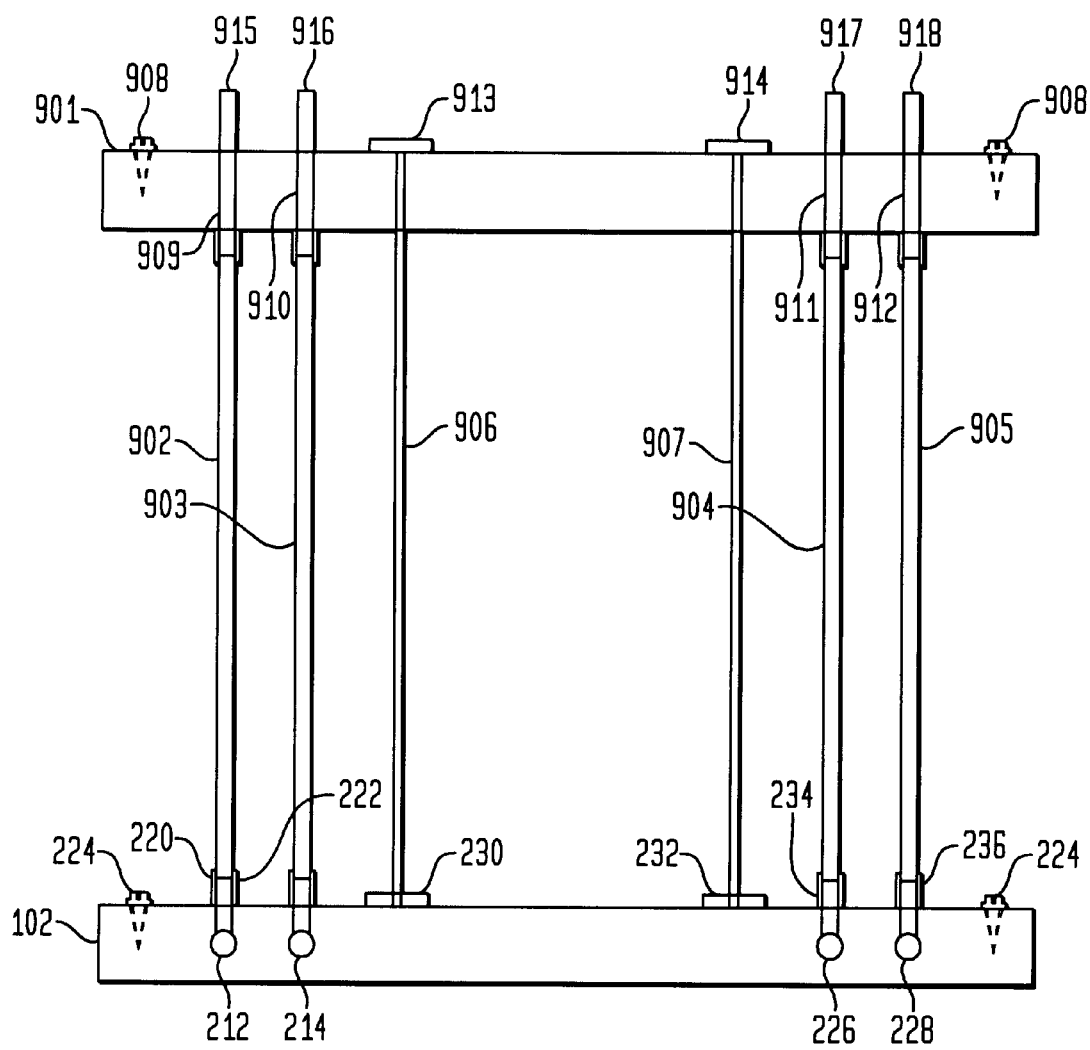
FIG. 9 is a cross sectional, elevation view of a remote manifold surface connected to the manifold of FIG. 2.

The present invention allows for the use of a bank of fluid, electrical and mechanical connectors remote from the manifold for connection with the individual cells, thereby providing for alternate arrangements of the battery system. FIG. 9 shows a remote manifold with a remote manifold surface 901, supporting a remote source fluid connector 909 connected to source fluid extension 902 for providing a remote source fluid aperture 915. The source fluid extension 902 can be connected to a source fluid connector 220 of the manifold 102 to provide fluid communication between the source fluid conduit 212 of the manifold 102 and the remote source fluid aperture 915. Similarly, a remote return fluid connector 910 connected to return fluid extension 903 can provide a remote return fluid aperture 916. The return fluid extension 903 can be connected to a return fluid connector 222 of the manifold 102 to provide fluid communication between the return fluid conduit 214 of the manifold 102 and the remote return fluid aperture 916. In addition, a remote electrical connector (remote anode) 913 supported by the remote manifold surface 901 can be used with a first electrical extension 906 for providing electrical connection between the remote anode 913 and the anode 230 of the manifold 102. In addition, a remote mechanical connector 908 can be used to engage a cell assembly 100 upon engagement with the remote manifold surface 901.

Where a second fluid system is used, the above described system can be employed using a second set of source and return fluid connectors 911, 912 connected a second set of to source and return fluid extensions 904, 905 for providing a second set of remote source fluid apertures 917, 918. Similarly, a second remote electrical connector (remote cathode) 914 supported by the remote manifold surface 901 can be used with a second electrical extension 907 for providing electrical connection between the remote cathode 914 and the cathode 232 of the manifold 102.

Thus, the present invention provides for a battery architecture which facilitates the connection and removal of cell assemblies from a manifold. Although the present invention has been described in connection with specific exemplary embodiments, it should be understood that various changes, substitutions and alterations can be made to the disclosed embodiments without departing from the spirit and scope of the invention as set forth in the appended claims.

We claim:

1. A removable electrochemical cell assembly for operation with a manifold, comprising:

a cell housing having an interface surface, a first chamber, a second chamber, and at least one mechanical connector;

a central membrane separating the first chamber and the second chamber;

at least one first inlet conduit and at least one first outlet conduit in fluid communication with the first chamber, the first inlet conduit and first outlet conduit extending from the first chamber through the interface surface and each having a fluid connector for removable engagement with the manifold;

at least one first electrical conductor in the first chamber;

at least one first electrical terminal extending from the first chamber through the interface surface, the first electrical terminal being electrically coupled to the first electrical conductor and having an electrical connector for removable engagement with the manifold;

at least one second electrical conductor in the second chamber; and at least one second electrical terminal extending from the second chamber through the interface surface, the second electrical terminal being electrically coupled to the second electrical conductor and having an electrical connector for removable engagement with the manifold;

wherein the interface provides the connectors of the first inlet and outlet conduits, and the connectors of the first and second electrical terminals in a removably engagable arrangement with the manifold.

2. A removable electrochemical cell assembly according to claim 1 further comprising at least one second inlet conduit and at least one second outlet conduit in fluid communication with the second chamber, the second inlet conduit and second outlet conduit extending from the second chamber through the interface surface.

3. A removable electrochemical cell assembly according to claim 1 further comprising:

a first inlet check valve in line with the first inlet conduit, and a first outlet fluid check valve in line with the first outlet conduit.

4. A removable electrochemical cell assembly according to claim 2 further comprising:

a first inlet check valve in line with the first inlet conduit, a first outlet fluid check valve in line with the first outlet conduit, a second inlet check valve in line with the second inlet conduit, and a second outlet fluid check valve in line with the second outlet conduit.

5. A removable electrochemical cell assembly according to claim 1, further comprising a first conductive filler material being electrically coupled to the first electrical conductor.

6. A removable electrochemical cell assembly according to claim 2, further comprising:

a first conductive filler material being electrically coupled to the first electrical conductor; and a second conductive filler material being electrically coupled to the second electrical conductor.

7. A removable electrochemical cell assembly according to claim 1, further comprising:
- a first drain conduit in fluid communication with the first chamber and extending from the first chamber through the interface surface, the first drain conduit having a drain conduit check valve; and
- a first chamber purge valve extending from the first chamber.

8. A removable electrochemical cell assembly according to claim 2, further comprising:
- a first drain conduit in fluid communication with the first chamber and extending from the first chamber through the interface surface, the first drain conduit having a first drain conduit check valve;
- a second drain conduit in fluid communication with the second chamber and extending from the second chamber through the interface surface, the second drain conduit having a second drain conduit check valve;
- a first chamber purge valve extending from the first chamber; and
- a second chamber purge valve extending from the second chamber.

9. A removable electrochemical cell assembly according to claim 1, further comprising:
- at least one additional fluid chamber;
- at least one additional membrane, the additional membrane separating the additional fluid chamber from at least one other chamber;
- at least one additional inlet conduit and at least one additional outlet conduit; and
- at least one additional electrical conductor.

10. A removable hydrogen cell assembly for operation with a manifold comprising:
- a hydrogen fuel cell having a hydrogen cell interface surface;
- a hydrogen gas inlet conduct in fluid communication with the hydrogen fuel cell;
- a fluid blocking filter in line with the hydrogen gas inlet conduct;
- an air inlet conduit in fluid communication with the hydrogen fuel cell;
- an air inlet valve in line with the air inlet conduit;
- a hydrogen cell fluid conduit having a fluid inlet aperture extending through the hydrogen cell interface surface, a fluid outlet aperture extending through the hydrogen cell interface surface, and a hydrogen collection chamber, the hydrogen collection chamber being in fluid communication with the hydrogen gas inlet conduit, the fluid inlet and fluid outlet apertures each having a fluid connector for removable engagement with the manifold;
- a by-product outlet conduit in fluid communication with the hydrogen fuel cell, the by-product outlet conduit having a by-product outlet aperture, the by-product outlet aperture being in fluid communication with the hydrogen cell fluid conduit and having a fluid connector for removable engagement with the manifold; and
- a first hydrogen cell electrical terminal being electrically coupled to the hydrogen cell, the first hydrogen cell electrical terminal extending through the hydrogen cell interface surface and having an electrical connector for removable engagement with the manifold,
- wherein the hydrogen cell interface surface provides the connectors of the fluid inlet and fluid outlet apertures, the connector of the hydrogen cell fluid conduit, and the connector of the first hydrogen cell electrical terminal in a removably engagable arrangement with the manifold.

11. A removable hydrogen cell assembly according to claim 10, further comprising:
- a by-product outlet check valve in line with the by-product outlet conduit; and
- a second hydrogen cell electrical terminal being electrically coupled to the hydrogen cell, the second hydrogen cell electrical terminal extending through the hydrogen cell interface surface.

12. An electrochemical cell manifold for operation with a removable cell assembly comprising:
- a manifold having a contact surface;
- at least one source fluid conduit supported by the manifold;
- at least one source fluid connector extending through the contact surface and in fluid communication with the at least one source fluid conduit, and being provided for removable engagement with the removable cell assembly;
- at least one return fluid conduit supported by the manifold;
- at least one return fluid connector extending through the contact surface in fluid communication with the at least one return fluid conduit, and being provided for removable engagement with the removable cell assembly;
- at least one first electrical conduit supported by the manifold;
- at least one first electrical receptor electrically coupled to the at least one first electrical conduit; and
- at least one first electrical terminal electrically coupled to the at least one first electrical conduit, and having an electrical connector for removable engagement with the removable cell assembly;
- wherein the contact surface provides the source and return fluid connectors, and the at least one first electrical connector in a removably engagable arrangement with the removable cell assembly.

13. An electrochemical cell manifold according to claim 12, further comprising:
- at least one second electrical conduit supported by the manifold;
- at least one second electrical receptor electrically coupled to the at least one second electrical conduit;
- at least one second electrical terminal electrically coupled to the at least one second electrical conduit; and
- at least one mechanical connector for holding the removable cell to the manifold.

14. An electrochemical cell manifold according to claim 12, further comprising at least one fluid drain conduit supported by the manifold, and
- at least one fluid drain connector extending through the contact surface and in fluid communication with the at least one fluid drain conduit.

15. An electrochemical cell manifold according to claim 12, further comprising:
- a source fluid valve in line with the at least one source fluid connector, and
- a return fluid valve in line with the at least one return fluid connector.

16. An electrochemical cell manifold according to claim 12, further comprising:

a remote contact surface;
a source fluid extension in fluid communication with the at least one source fluid connector for providing a source fluid aperture at the remote contact surface;
a return fluid extension in fluid communication with the at least one return fluid connector for providing a return fluid aperture at the remote contact surface; and
a first electrical extension being electrically coupled to the at least one first electrical connector for providing a first remote electrical connection at the remote contact surface.

17. An electrochemical cell manifold according to claim 16, further comprising:
a second electrical extension being electrically coupled to the at least one second electrical connector for providing a second remote electrical connection at the remote contact surface; and
a remote mechanical connector.

18. An electrochemical cell system comprising:
a manifold;
a removable cell assembly including:
    a cell housing having an interface surface, a first chamber, a second chamber, and at least one mechanical connector;
    a central membrane separating the first chamber and the second chamber;
    at least one first inlet conduit and at least one first outlet conduit in fluid communication with the first chamber, the first inlet conduit and first outlet conduit extending from the first chamber through the interface surface, and each having a fluid connector for removable engagement with the manifold;
    at least one second inlet conduit and at least one second outlet conduit in fluid communication with the second chamber, the second inlet conduit and second outlet conduit extending from the second chamber through the interface surface, and each having a fluid connector for removable engagement with the manifold;
    at least one first electrical conductor in the first chamber;
    at least one first electrical terminal extending from the first chamber through the interface surface, the first electrical terminal being electrically coupled to the first electrical conductor, and having an electrical connector for removable engagement with the manifold;
    at least one second electrical conductor in the second chamber;
    at least one second electrical terminal extending from the second chamber through the interface surface, the second electrical terminal being electrically coupled to the second electrical conductor, and having an electrical connector for removable engagement with the manifold;
the manifold comprising a contact surface;
at least one first source fluid conduit supported by the manifold;
at least one first source fluid connector extending through the contact surface, the at least one first source fluid connector in fluid communication with the at least one first inlet conduit and the at least one first source fluid conduit, and being provided for removable engagement with the removable cell assembly;
at least one first return fluid conduit supported by the manifold, the at least one first return fluid conduit in fluid communication with the at least one first outlet conduit, and being provided for removable engagement with the removable cell assembly;
at least one second source fluid conduit supported by the manifold,
at least one second source fluid connector, the at least one second source fluid connector extending through the contact surface, the at least one second source fluid connector in fluid communication with the at least one second source fluid conduit, and being provided for removable engagement with the removable cell assembly;
at least one second return fluid conduit supported by the manifold;
at least one second return fluid connector extending through the contact surface, the at least one second return fluid connector in fluid communication with the at least one second outlet conduit and the at least one second return fluid conduit, and being provided for removable engagement with the removable cell assembly;
at least one first electrical conduit supported by the manifold, the at least one first electrical conduit being electrically coupled to the first electrical conductor;
at least one first electrical terminal being electrically coupled to the at least one first electrical conduit, and being provided for removable engagement with the removable cell assembly;
at least one second electrical conduit supported by the manifold, the at least one second electrical conduit being electrically coupled to the second electrical conductor;
at least one second electrical terminal being electrically coupled to the at least one second electrical conduit, and being provided for removable engagement with the removable cell assembly; and
at least one mechanical connector mechanically engagable with the removable cell assembly and the manifold, and being provided for removable engagement of the removable cell assembly with the manifold.

19. The electrochemical cell system, according to claim 18, further comprising:
a first source fluid reservoir in fluid communication with the first source fluid conduit;
a first source pump in line with the first source fluid reservoir for providing fluid flow from the first source fluid reservoir to the first source fluid conduit;
a first return fluid reservoir in fluid communication with the first return fluid conduit; and
a first return pump in line with first return fluid reservoir for providing fluid flow from the first return fluid conduit to the first return fluid reservoir.

20. The electrochemical cell system according to claim 18, further comprising:
a first source fluid reservoir in fluid communication with the first source fluid conduit;
a first source pump in line with the first source fluid reservoir for providing fluid flow from the first source fluid reservoir to the first source fluid conduit;
a first return fluid reservoir in fluid communication with the first return fluid conduit;
a first return pump in line with the first return fluid reservoir for providing fluid flow from the first return fluid conduit to the first return fluid reservoir;

a second source fluid reservoir in fluid communication with the second source fluid conduit;

a second source pump in line with the second source fluid reservoir for providing fluid flow from the second source fluid reservoir to the second source fluid conduit;

a second return fluid reservoir in fluid communication with the second return fluid conduit; and a second return pump in line with the second return fluid reservoir for providing fluid flow from the second return fluid conduit to the second return fluid reservoir.

21. An electrochemical cell system according to claim 19, further comprising:

a first cell drain conduit in fluid communication with the first chamber, the first cell drain conduit extending from the first chamber through the interface surface;

a first chamber purge valve extending from the first chamber; and at least one first manifold drain conduit supported by the manifold, the first manifold drain conduit in fluid communication with first cell drain conduit and the first return fluid reservoir.

22. An electrochemical cell system according to claim 20, further comprising:

a first cell drain conduit in fluid communication with the first chamber, the first cell drain conduit extending from the first chamber through the interface surface;

a second cell drain conduit in fluid communication with the second chamber, the second cell drain conduit extending from the second chamber through the interface surface;

a first chamber purge valve extending from the first chamber;

a second chamber purge valve extending from the second chamber;

at least one first manifold drain conduit supported by the manifold, the first manifold drain conduit in fluid communication with first cell drain conduit and the first return fluid reservoir; and at least one second manifold drain conduit supported by the manifold, the second manifold drain conduit in fluid communication with second cell drain conduit and the second return fluid reservoir.

23. An electrochemical cell system according to claim 18, further comprising:

a hydrogen fuel cell having a hydrogen cell interface surface;

a hydrogen gas inlet conduit in fluid communication with the hydrogen fuel cell;

a fluid blocking filter in line with the hydrogen gas inlet conduit;

an air inlet conduit in fluid communication with the hydrogen fuel cell;

an air inlet valve in line with the air inlet conduit;

a hydrogen cell fluid conduit having a fluid inlet aperture extending through the hydrogen cell interface surface and in fluid communication with the at least one source fluid connector, a fluid outlet aperture extending through the hydrogen cell interface surface and in fluid communication with the at least one first return fluid connector, and a hydrogen collection chamber, the hydrogen collection chamber being in fluid communication with the hydrogen gas inlet conduit;

a by-product outlet conduit in fluid communication with the hydrogen fuel cell and the source fluid conduit;

a by-product outlet check valve in line with the by-product outlet conduit;

a first hydrogen electrical terminal being electrically coupled to the hydrogen cell and the at least one first electrical conduit;

a second hydrogen electrical terminal being electrically coupled to the hydrogen cell and the at least one second electrical conduit; and a hydrogen cell mechanical connector mechanically engaged with the contact surface and the hydrogen fuel cell.

24. A removable electrochemical cell assembly for operation with a manifold, comprising:

a cell housing having an interface surface, a first chamber, a second chamber, and at least one mechanical connector;

a central membrane separating the first chamber and the second chamber;

at least one first inlet conduit and at least one first outlet conduit in fluid communication with the first chamber, the first inlet conduit and first outlet conduit extending from the first chamber through the interface surface and each having a fluid connector for removable engagement with the manifold;

at least one first electrical conductor in the first chamber;

at least one first electrical terminal extending from the first chamber through the interface surface, the first electrical terminal being electrically coupled to the first electrical conductor and having an electrical connector for removable engagement with the manifold;

at least one second electrical conductor in the second chamber; and at least one second electrical terminal extending from the second chamber through the interface surface, the second electrical terminal being electrically coupled to the second electrical conductor and having an electrical connector for removable engagement with the manifold;

wherein the connectors of the first inlet and outlet conduits, and the connectors of the first and second electrical terminals are arranged in a first direction for removable engagement with the manifold whereby the removable electrochemical cell assembly is removably engagable with the manifold in the first direction.

25. The removable electrochemical cell assembly for operation with a manifold according to claim 24 wherein the interface surface is a planar contact surface.

* * * * *